United States Patent
Soga et al.

(10) Patent No.: US 7,386,311 B2
(45) Date of Patent: Jun. 10, 2008

(54) COMMUNICATION SYSTEM, MOBILE COMMUNICATION NETWORK, CONTENTS SERVER, PROGRAM AND RECORDING MEDIUM

(75) Inventors: Makoto Soga, Tokyo (JP); Takashi Seki, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 594 days.

(21) Appl. No.: 10/761,663

(22) Filed: Jan. 20, 2004

(65) Prior Publication Data
US 2004/0192195 A1 Sep. 30, 2004

(30) Foreign Application Priority Data
Jan. 31, 2003 (JP) .............................. 2003-024664

(51) Int. Cl.
*H04Q 7/20* (2006.01)
(52) U.S. Cl. .............................. 455/432.1; 455/432.2; 455/432.3; 455/414.1; 455/414.2; 455/406; 455/456.3
(58) Field of Classification Search ............. 455/414.1, 455/414.2, 412.1, 3.01, 3.02, 3.03, 3.04, 455/3.05, 3.06, 403, 404.2, 412.2, 432.1, 455/432.2, 432.3, 435.1, 406, 407, 408, 456.3, 455/414.3
See application file for complete search history.

(56) References Cited

U.S. PATENT DOCUMENTS

| | | | |
|---|---|---|---|
| 5,564,068 A * | 10/1996 | Nguyen ........................ | 455/433 |
| 6,684,073 B1 * | 1/2004 | Joss et al. .................... | 455/433 |
| 6,738,622 B1 * | 5/2004 | Stadelmann et al. ..... | 455/435.1 |

(Continued)

FOREIGN PATENT DOCUMENTS

JP    H 05-236074    9/1993

(Continued)

OTHER PUBLICATIONS

ETSI "Digital Celluar Telecommunications System (Phase 2+) (GSM); Universal Mobile Telecommunications System (UMTS); General Packet Radio Service (GPRS) Service description; Stage 2 (3GPP TS 23.060 version 5.1.0 Release 5)" *ETSI TS 123 060*, v5.1.0, Mar. 2002, pp. 1, 118-124, 157-161, 185-192.

(Continued)

*Primary Examiner*—Matthew Anderson
*Assistant Examiner*—Dominic E. Rego
(74) *Attorney, Agent, or Firm*—Brinks Hofer Gilson & Lione

(57) ABSTRACT

A provider code is added to a request signal transmitted to contents server SP1 from mobile unit MS by mobile communication network GSM. Border switching station CMMS adds a roaming flag to the request signal, and forwards the request signal to gateway unit GW. Gateway unit GW converts the provider code contained in the request signal into the country code by referring to the code conversion table, and transmits HTTP request to contents server CP1 after adding the country code and roaming identification information to HTTP header. When contents server CP1 receives the above-mentioned HTTP request, CP1 determines whether the requested contents are allowed to be transmitted abroad by referring to the transmission table. When transmission of the requested contents is not permitted, contents server CP1 transmits an error notification to mobile unit MS to notify that transmission is not permitted.

6 Claims, 11 Drawing Sheets

U.S. PATENT DOCUMENTS

| | | | |
|---|---|---|---|
| 6,826,414 B1* | 11/2004 | Reynolds et al. | 455/555 |
| 6,871,065 B2* | 3/2005 | Yamaguchi | 455/414.1 |
| 6,999,762 B2* | 2/2006 | Uchida | 455/432.1 |
| 7,219,225 B2* | 5/2007 | Rhodes | 713/153 |
| 2002/0023010 A1 | 2/2002 | Piccionelli et al. | |
| 2002/0107006 A1* | 8/2002 | Nitta | 455/414 |
| 2003/0013458 A1* | 1/2003 | Yabe et al. | 455/456 |
| 2003/0083067 A1* | 5/2003 | Hanson | 455/433 |
| 2003/0100303 A1* | 5/2003 | Armbruster et al. | 455/433 |
| 2004/0093253 A1 | 5/2004 | Iijima | |
| 2004/0157600 A1* | 8/2004 | Stumpert et al. | 455/432.1 |
| 2005/0102422 A1* | 5/2005 | Yamamote et al. | 709/238 |
| 2005/0119000 A1* | 6/2005 | Nasielski et al. | 455/433 |

FOREIGN PATENT DOCUMENTS

| | | |
|---|---|---|
| JP | 2001-285916 | 10/2001 |
| JP | 2001-291021 | 10/2001 |
| WO | WO 99/55102 A | 10/1999 |
| WO | WO 02/089442 A | 11/2002 |
| WO | WO 02/091262 | 11/2002 |

OTHER PUBLICATIONS

Japanese Office Action mailed Dec. 12, 2006.

* cited by examiner

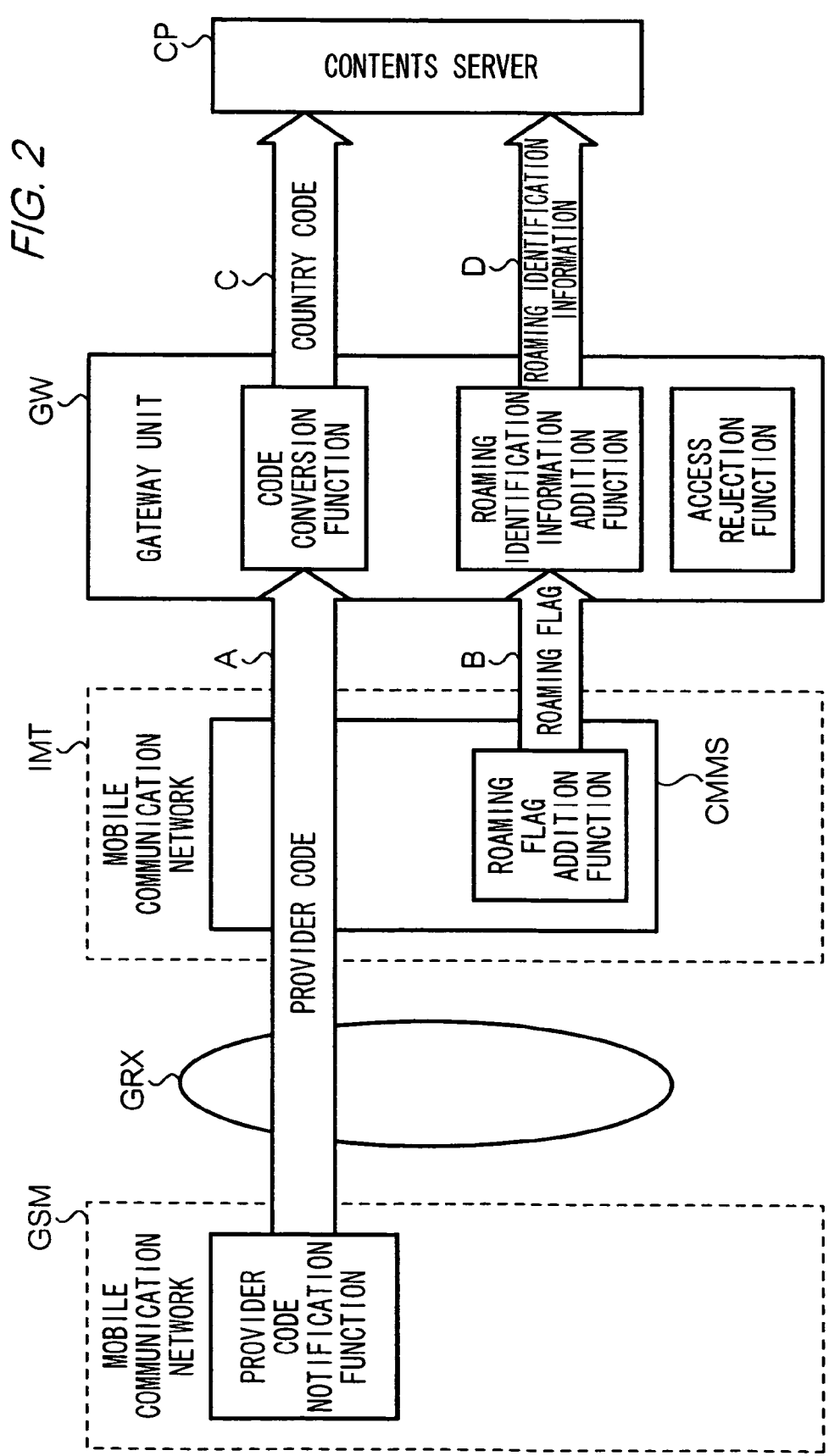

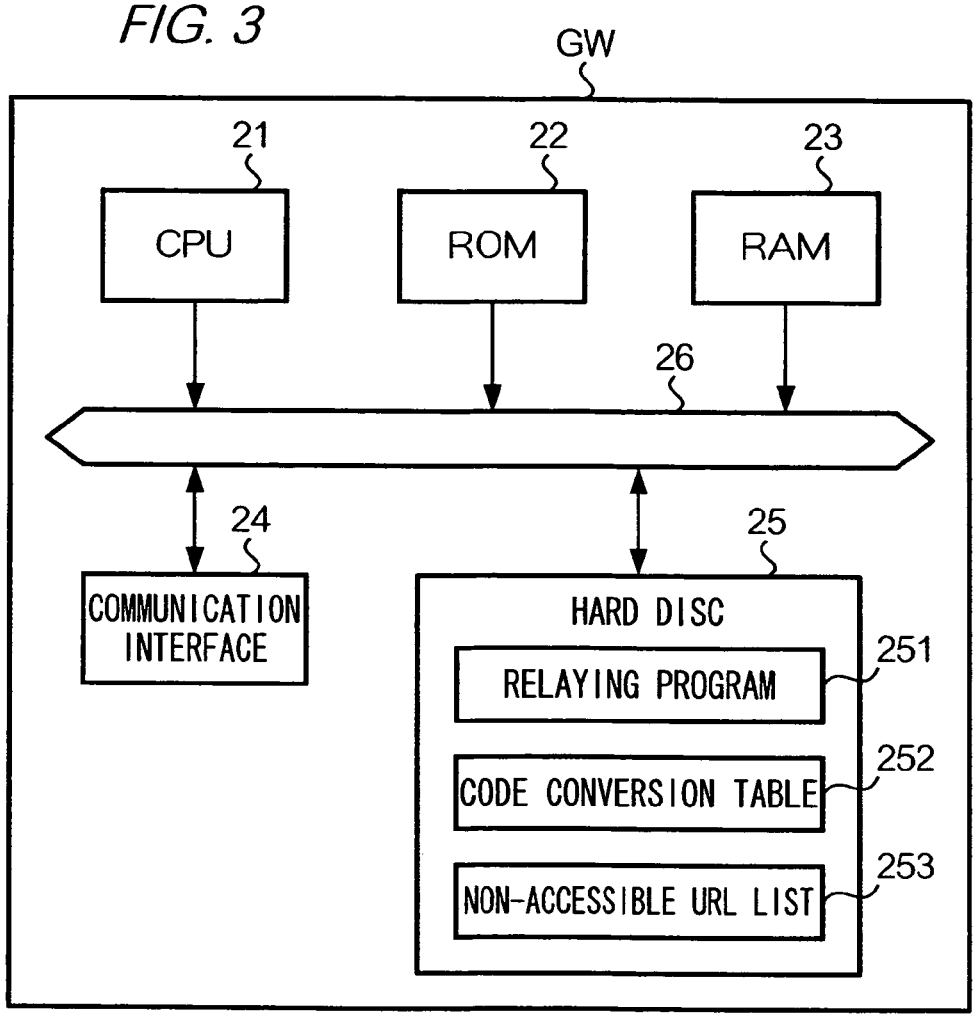

FIG. 8

| FILE NAME | TRANSMITTABLE ABROAD OR NOT |
|---|---|
| photo.gif | NO |
| music.midi | NO |
| schedule.file | YES |
| ・・・・・ | ・・・・・ |
| ・・・・・ | ・・・・・ |
| ・・・・・ | ・・・・・ |
| ・・・・・ | ・・・・・ |

FIG. 9

| FILE NAME | TRANSMITTABLE ABROAD OR NOT | FILE NAME OF PROXY CONTENTS |
|---|---|---|
| movie.gif | NO | aaa.gif |
| song.midi | NO | bbb.midi |
| schedule.file | YES | — |
| ・・・・・ | ・・・・・ | ・・・・・ |
| ・・・・・ | ・・・・・ | ・・・・・ |
| ・・・・・ | ・・・・・ | ・・・・・ |
| ・・・・・ | ・・・・・ | ・・・・・ |

| COUNTRY CODE | FILE NAME OF MENU FILE |
|---|---|
| C1001 | C1001menu.html |
| C1002 | C1002menu.html |
| C1003 | C1003menu.html |
| ..... | ..... |
| ..... | ..... |
| ..... | ..... |

MT

| FILE NAME | CODE OF FOREIGN COUNTRIES WHERE CONTENTS CAN BE TRANSMITTED |
|---|---|
| best.gif | C1001 |
| soul.midi | — |
| mountain.jpeg | C1001,C1002,C1003 |
| ..... | ..... |
| ..... | ..... |
| ..... | ..... |

CT

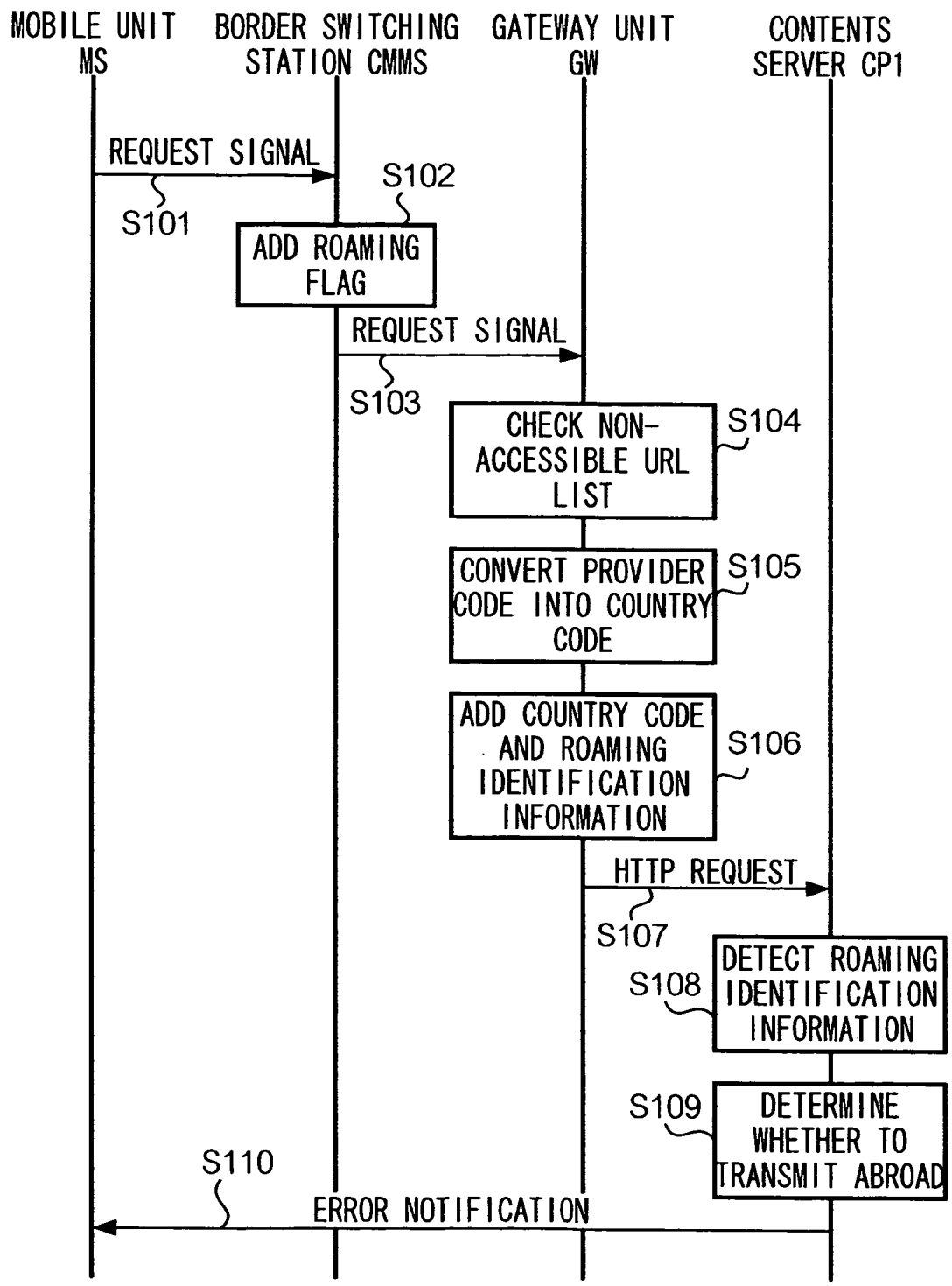

COMMUNICATION SYSTEM, MOBILE COMMUNICATION NETWORK, CONTENTS SERVER, PROGRAM AND RECORDING MEDIUM

TECHNICAL FIELD

The present invention relates to the art of transmitting contents to a mobile unit by using a roaming service.

BACKGROUND ART

In recent years, a roaming service for not only a fixed telephone, but also for a cellular telephone has been in common use. A roaming service provides a user who has a contractual agreement with a communication provider, several communication services from another communication provider, which is affiliated with the user's communication provider by using a network facility of the affiliated communication provider.

For example, when a user uses a roaming service across the border (hereinafter, referred to as an international roaming service), the user of a cellular telephone can receive the communication services provided by the communication provider of his/her country, even when the user is in a foreign country, via a network facility of a communication provider of the foreign country. Various features have been proposed as to how to appropriately provide to a user several communication services in the international roaming service (for example, refer to Laid-Open Disclosure Public Patent Bulletin issue by the Japan Patent Office 93-236074).

In recent years, a cellular telephone has tended to be used more for non-voice communication than for voice communication. For example, a cellular telephone is commonly used for downloading various contents from the WWW (World Wide Web) server via the Internet, and for reproducing and outputting the downloaded contents.

A contents transmission service for storing and transmitting the various contents accessed by users from the WWW is provided by a number of different contents providers. Contents, both visual and audio are provided, for example, a character image of a popular cartoon, or the music of a hit song. But such contents are often protected by copyright. In such a case, a contents provider carries out a contents transmission service by signing an approval contract with a copyright holder beforehand by which the requisite fee for the content is collected from the user and paid to the copyright holder.

In regions where the international roaming service explained above is widely available, a user is able to receive the above-mentioned contents transmission service anywhere in the world via a mobile communication network of the region the user is in.

Although the above service is convenient for the user, there remains the issue of the copyright of contents. An approval contract of the copyright use is normally signed as a result of limiting the region where contents can be used (transmitted). Hence, for example, in the case of contents that can be used (transmitted) only in Japan according to the contract, the transmission of contents is allowed in Japan, but the transmission of contents abroad is not allowed. Therefore, receiving contents outside their copyright permitted region by using the transmission service of an international roaming service would violate the copyright of the contents.

In addition to the problem of copyright, the use of an international roaming service for downloading contents can pose a further problem. Depending upon a country's socio-cultural, political or moral values the transmission of certain contents may be unacceptable or even prohibited in a country or region. Hence, contents providers are required to carry out a more appropriate contents transmission process by taking into account the circumstances of a country or a region.

Further, a steady increase in integration, amalgamation, capital and business alliances, between a plurality of communication providers will be seen in the future, because of continuing globalization of economy. Hence, for example, communication providers with a close relationship to carry out capital alliance with each other might wish to achieve a roaming service which is more effective and reliable than a roaming service carried out with other communication providers. Therefore, a system by which a roaming service can be switched between various communication providers would be more convenient to each communication provider.

DISCLOSURE OF INVENTION

The present invention was developed to overcome the problems of the above mentioned prior art. The object of the present invention is to provide a system which is able to carry out an appropriate service when transmitting contents by using a roaming service by taking into account circumstances of a country or a region where the mobile unit to which contents are transmitted is in, or circumstances of the mobile communication network the mobile unit to which contents are transmitted belongs to.

To solve the above-mentioned problem, the present invention provides a communication system comprising: a first mobile communication network; a second mobile communication network for providing to a mobile unit of a user under a contractual agreement with the second mobile communication network a roaming service via the first mobile communication network; and a contents server for transmitting to a mobile unit contents via the second mobile communication network, or via the second mobile communication network and the first mobile communication network, wherein the second mobile communication network comprising: data relaying means for receiving a data signal addressed to the contents server and transmitted from a mobile unit, and transmitting to the contents server the received data signal; storage means for storing contents identification information identifying contents which are designated not to be transmitted to a mobile unit in the first mobile communication network and can be transmitted from the contents server; and rejection means for rejecting a request for any one of contents denoted by contents identification information stored in the storage means, contained in a data signal which is received by the data relaying means, addresses to the contents server and transmitted from a mobile unit in the first mobile communication network.

In the above communication system, the second mobile communication network stores contents identification information for identifying contents not to be transmitted to a mobile unit in the first mobile communication network. When the second mobile communication network receives from a mobile unit in the first mobile communication network a data signal which requests contents denoted by the contents identification information which the data signal stores, the request stored in the data signal is rejected; therefore, it is possible not to provide an inappropriate contents transmission service in the region where the first mobile communication network is installed.

Also, the present invention provides a relaying unit which is installed in a mobile communication network for providing to a mobile unit of a user under a contractual agreement with a network in which the relaying unit is provided, a roaming service via another mobile communication network, the relaying unit comprising: data relaying means for receiving a data signal transmitted from a mobile unit and addressed to a contents server which provides a contents transmission service, and transmitting to the contents server the received data signal; and addition means for adding certain identification information to a data signal received from a mobile unit in another mobile communication network and transmitted to the contents server by the relaying means.

Also, the present invention provides a relaying unit which is provided in a mobile communication network for providing to a mobile unit of a user under a contractual agreement with a network in which the relaying unit is provided, a roaming service via another mobile communication network, the relaying unit comprising: data relaying means for receiving a data signal transmitted from a mobile unit and addressed to a contents server which provides a contents transmission service, and transmitting to the contents server the received data signal; storage means for storing contents identification information identifying contents which are designated not to be transmitted to a mobile unit in the another mobile communication network and can be transmitted from the contents server; and rejection means for rejecting a request for any one of contents denoted by contents identification information stored in the storage means, contained in a data signal which is received by the data relaying means, addresses to the contents server and transmitted from a mobile unit in another mobile communication network.

Also, the present invention provides a contents server comprising: contents transmission means for receiving a data signal transmitted from a mobile unit via a mobile communication network, and transmitting contents to the mobile unit in response to a request contained in the data signal; and detection means for detecting whether a data signal received by the contents transmission means is attached with identification information showing that the data signal is transmitted from a mobile unit in a mobile communication network which is not a mobile communication network to which the server is connected, wherein the contents transmission means, when the detection means detects that the data signal is attached with the identification information, transmits to a mobile unit which transmits the data signal notification that requested contents cannot be transmitted.

Also, the present invention provides a contents server comprising: contents transmission means for receiving a data signal transmitted from a mobile unit via a mobile communication network, and transmitting contents to the mobile unit in response to a request contained in the data signal; and detection means for detecting whether a data signal received by the contents transmission means is attached with identification information showing that the data signal is transmitted from a mobile unit in a mobile communication network which is not a mobile communication network to which the server is connected, wherein the contents transmission means, when the detection means detects that the data signal is attached with the identification information, transmits to a mobile unit which transmits the data signal, proxy contents for substituting the contents.

Also, the present invention provides a contents server comprising: contents transmission means for receiving a data signal transmitted from a mobile unit via a mobile communication network, and transmitting contents to the mobile unit in response to a request contained in the data signal; and detection means for detecting whether a data signal received by the contents transmission means is attached with identification information for identifying an area served by a mobile communication network to which the mobile unit belongs, or with identification information for identifying a mobile communication network itself to which the mobile unit belongs, wherein the contents transmission means, when the detection means detects that the data signal is attached with the identification information, transmits contents in accordance with the identification information to the mobile unit.

BRIEF DESCRIPTION OF DRAWINGS

FIG. 2 is a pattern diagram for explaining a mechanism for notifying a contents server whether access is from a roaming origin or a roaming end in the system.

FIG. 3 is a block diagram showing a configuration of a gateway server of the system.

FIG. 4 is a diagram showing one example of a code conversion table of the system.

FIG. 8 is a diagram showing one example of a transmission table of the system.

FIG. 9 is a diagram showing one example of a transmission table of the system.

FIG. 11 is a sequence diagram showing an operation example of the system.

EMBODIMENT OF THE INVENTION

Hereinafter, by referring to figures, the embodiment of the present invention will be explained. The present invention is not restricted to the following embodiments, and various changes are possible without departing from the spirit and the scope of the invention.

A: Configuration

Hereinafter, the communication system of one embodiment of the present invention will be explained. The same code is given to common portions in figures.

(1) Entire Configuration of System

Figure 1:
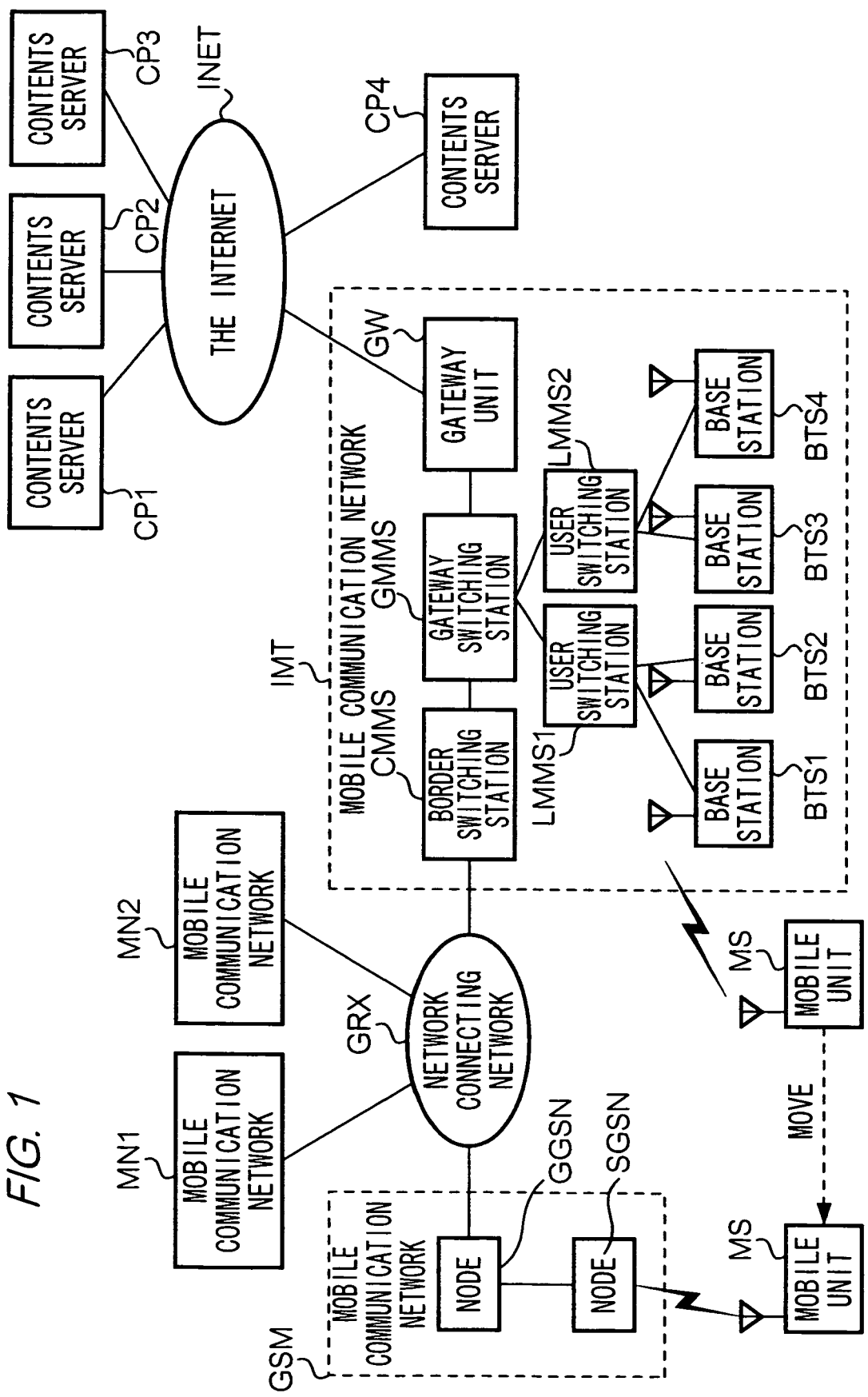
FIG. 1 is a block diagram showing the entire configuration of a communication system relating to one embodiment of the present invention.

FIG. 1 is a block diagram showing the entire configuration of the communication system. In FIG. 1, mobile communication network IMT is a network facility in compliance with IMT-2000 (International Mobile Telecommunication-2000) mode. Mobile communication network IMT is administered by communication provider A of a certain country (such as Japan), and provides to mobile unit MS which a user under communication service contract with communication provider A (hereinafter, referred to as a contracted user of communication provider A) uses a communication service such as calling or data communication.

Mobile communication network GSM is a known network facility in compliance with GSM (Global System for Mobile Communication) mode. Mobile communication network GSM is administered by communication provider B of a certain country (such as The United States), and provides to a mobile unit which a user under communication service contract with communication provider B (not shown) uses a communication service such as calling or data communication.

Mobile communication network IMT, mobile communication network GSM, and a plurality of mobile communication networks MN1, MN2 which communication providers of other countries or regions administer are connected to each other by network connecting network GRX installed across each country. Each communication provider of mobile communication networks IMT, GSM, MN1 and MN2 can provide an international roaming service to mobile units which users with a contractual agreement with communication providers use on the basis of business alliances regarding international roaming for mutual benefit. For example, mobile unit MS, as shown by the arrow with a dotted line in FIG. 1, can receive a communication service via mobile communication network GSM, network connecting network GRX and mobile communication network IMT when mobile unit MS moves to the service area of mobile communication network GSM from the service area of mobile communication network IMT. In the present embodiment, the presence of a mobile unit in the service area of mobile communication network IMT (or GSM) is expressed by the expression "a mobile unit is in mobile communication network IMT (or GSM)."

Mobile communication network IMT comprises a plurality of base stations BTS 1 to BTS 4, a plurality of user switching stations LMMSS1, LMMS2, border switching station CMMS, gateway switching station GMMS, and gateway unit GW. Since the configuration and operation of each of base stations BTS 1 to BTS 4 are the same, the explanation will be provided by collectively referring to all of the base stations as base station BTS unless a separate explanation needs to be provided for a certain base station. User switching stations LMMS 1 and LMMS 2 are collectively referred to as user switching station LMMS for the same reason.

Base station BTS is placed by communication provider A at a constant interval in a communication service area, and carries out radio communication with mobile unit MS in the radio cell formed by each base station BTS.

Each of user switching station LMMS, border switching CMMS and gateway switching station GMMS is a facility comprising a line switching function and a packet switching function in mobile communication network IMT. User switching station LMMS is connected to a plurality of base stations BTS. Gateway switching station GMMS is connected to user switching station LMMS, border switching station CMMS, and gateway unit GW. Border switching station CMMS is connected to network connecting network GRX and gateway switching station GMMS. Among the above-mentioned switching stations, user switching station LMMS and gateway switching station GMMS do not differ from known switching stations, but border switching station CMMS comprises a roaming flag addition function (described later) in addition to the known line switching function and packet switching function.

Next, gateway unit GW is connected to gateway switching station GMMS and Internet INET. Gateway unit GW, in addition to an ordinary gateway function of switching protocols between mobile communication network IMT and Internet INET, and relaying data signals exchanged between mobile communication network IMT and Internet INET, comprises a code conversion function and a roaming identification information addition function (explained later).

Mobile communication network GSM is a known network facility as explained above, and comprises node facility GGSN which is the same as the above-mentioned border switching station GMMS, node facility SGSN which is the same as the above-mentioned user switching station LMMS, and base station facility (not shown) which is the same as base station BTS.

Each of contents servers CP 1 to CP 4 connected to Internet INET is administered by an administrator with the same nationality as that of communication provider A (in this case, Japan). Hereinafter, contents servers CP 1 to CP 4 will be collectively referred to as contents server CP unless contents servers CP 1 to CP 4 need to be distinguished for any particular reason.

Contents server CP comprises the same function as that of a general WWW (World Wide Web) server unit, and stores data in a file style showing each of contents (hereinafter, simply referred to as contents) and HTML (Hypertext Markup Language) data in a fixed memory such as a hard disc. Contents server CP, when receiving an HTTP request containing URL (Uniform Resource Locator) for identifying contents, usually returns an HTTP response containing contents identified by the above-mentioned URL to the sender of the HTTP request. In this case, contents refer to information expressed by any one of a text, music or an image such as news, electronic book, audio, a video clip or a homepage. Contents also contain several computer programs such as game software or Java (trademark registered) applet. Some contents are protected by copyright. With regard to contents protected by copyright, some contents are allowed to be used only in Japan whereas some are also allowed to be used abroad.

Each of contents servers CP 1 to CP 3, when mobile unit MS which is a sender of an HTTP request sends the above-mentioned request in Japan, carries out a different operation in response to the HTTP request than when mobile unit MS transmits the above-mentioned request by using an international roaming service from a country other than Japan. Hereinafter, the region where the mobile communication network in which mobile unit MS is actually present when the service is provided is installed, is referred to as a roaming end (in this case, Japan), and the region where a mobile communication network of a communication provider with whom the user of mobile unit MS is under a contractual agreement of receiving a communication service is referred to as a roaming origin (in this case, a foreign country).

First, contents server CP1 carries out the above-mentioned operation in response to the access attempt from mobile unit MS in the roaming origin, but transmits to mobile unit MS an error message that the request cannot be accepted when mobile unit MS attempts to obtain contents from a roaming end, which are protected by copyright.

Next, contents server CP2 carries out an operation in response to access attempt from mobile unit MS in a roaming origin, but transmits to mobile unit MS proxy contents when mobile unit MS in a roaming end attempts to obtain contents which are protected by copyright.

Next, contents server CP3 carries out an operation in response to access from mobile unit MS in a roaming origin, but transmits, when mobile unit MS in a roaming end attempts to obtain contents, only contents which can be transmitted to the country of the roaming end. Contents which can be transmitted to the country are contents regarded as appropriate for transmission, taking into account not only copyright restrictions but also cultural restrictions of a country.

Contents server CP4 carries out an operation in response to access attempt from mobile unit MS in a roaming origin, but rejects access attempt from a mobile unit in a roaming end since access from a roaming end is not permitted. However, the unit that rejects access is not contents server CP4 itself, but gateway unit GW.

Next, by referring to the pattern diagram of FIG. 2, the mechanism for notifying contents server CP whether access is from mobile unit MS in a roaming origin or a roaming end will be explained.

For an international roaming service to be offered, the communication fee to be charged to a user needs to be determined by the mobile communication network in which mobile unit MS is when the service is offered (hereinafter, referred to as a roaming end mobile communication network) and the mobile communication network of the communication provider whom the user of mobile unit MS is under a communication service contract with (hereinafter, referred to as a roaming origin mobile communication network). Hence, when an international roaming service is offered, the provider code of the communication provider administering the roaming end mobile communication network usually is notified to the roaming origin mobile communication network from the roaming end mobile communication network. In other words, as shown by arrow A of FIG. 2, when mobile communication network GSM adds the provider code to the data signal transmitted by mobile unit MS, the provider code is notified to mobile communication network IMT from mobile communication network GSM. The notified provider code directly reaches gateway unit GW via border switching station CMMS. The function for adding the provider code to the data signal transmitted from mobile unit MS (referred to as a provider code notification function) is achieved by which unit constituting mobile communication network GSM can be determined by communication provider B accordingly. For example, the unit can be node GGSN or other exclusive units.

Border switching station CMMS comprises a roaming flag addition function for adding identification information referred to as a roaming flag to the data signal received via network connection network GRX. Hence, to the data signal via border switching station CMMS, as shown by arrows A and B of FIG. 2, a roaming flag is added in addition to the above-mentioned provider code. Accordingly, communication provider A determines to which field of the data signal border, switching station CMMS should add the roaming flag.

Gateway unit GW converts the protocol for the received data signal. Gateway unit GW comprises a roaming identification information addition function by which, when a roaming flag is contained in the received data signal during the protocol conversion, the roaming flag is converted into roaming identification information which contents server CP can interpret, and is sent out to Internet INET by inserting into the header of an HTTP message (hereinafter, referred to as HTTP header).

Further, gateway unit GW comprises the code conversion function, when the provider code is contained in the received data signal, for converting the provider code into the common country code which contents server CP can interpret during the above-mentioned protocol conversion, and sending out the converted country code to Internet INET by inserting into the HTTP header. The code conversion function is necessary since provider codes notified by mobile communication networks such as GSM, MN1 or MN2 are codes determined by systems set up among only the communication providers, and contents server CP cannot interpret contents of provider codes. Into which field of HTTP header gateway unit GW should inserts the above-mentioned identification information or the country code needs to be determined by communication provider A and the administrators of each of contents servers CP.

By the roaming identification information addition function and the code conversion function, as shown by arrows C and D in FIG. 2, the data signal to which the country code and roaming identification information are added is transmitted to contents server CP from gateway unit GW.

Further, gateway unit GW comprises, instead of contents server CP4, the access rejection function for rejecting attempt to obtain contents. Specifically, gateway unit GW stores a non-accessible URL list in which URL of resources to which access is not allowed by mobile unit MS to obtain the resources in a roaming end. Then, when URL of the address in the data signal to be relayed matches one URL contained in the non-accessible URL list, gateway unit GW transmits an error notification to mobile unit MS from which the data signal is sent.

(2) Configuration of Gateway Unit GW

FIG. 3 is a figure showing the configuration of gateway unit GW.

As shown in FIG. 3, gateway unit GW comprises CPU (Central Processing Unit) 21, ROM (Read Only Memory) 22, RAM (Random Access Memory) 23, communication interface 24, hard disc 25, and bus 26 to connect above units. In ROM 22, is stored the control program for controlling the basic control such as IPL (Initial Program Loader). CPU 21 achieves several functions (described later) by executing several programs stored in ROM 22 or hard disc 25. RAM 23 is used as a work area of CPU 21. In RAM 23, for example, a program is executed by CPU 21, or several kinds of data used for execution of the program are temporarily stored. Communication interface 24 is connected to Internet INET or gateway switching station GMMS, and exchanges data signals with a communication unit being connected to Internet INET or gateway switching station GMMS.

In hard disc 25, are stored relaying program 251 for carrying out a protocol conversion process of a data signal or a relaying process in which the process for achieving the above-mentioned conversion function, the roaming identification information addition function and the access rejection function is written, code conversion table 252 used for achieving the code conversion function, and non-accessible URL list 253 used for achieving the above-mentioned access rejection function.

FIG. 4 is a figure showing one example of contents written in code conversion table 252. In the example shown in FIG. 4, the communication provider denoted by the provider code "100010XX1PL" (in this case, communication provider B) is a communication provider in the country denoted by country code "C1001" (in this case, The United States).

Figure 5:
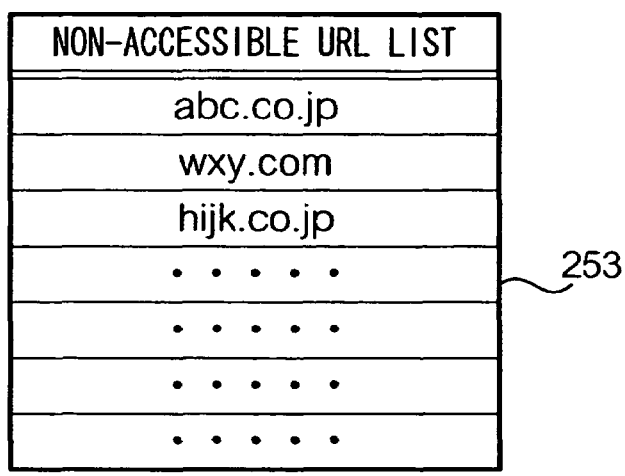
FIG. 5 is a diagram showing one example of a non-accessible URL list of the system.

FIG. 5 is a figure showing one example of contents written in non-accessible URL list 253. In the example shown in FIG. 5, access from a roaming end to obtain resources of URLs containing domain names "abc.cojp", "wxy.co.jp", and "hijk.co jp." is rejected.

Next, by referring to the flow shown in FIG. 6, the operation of CPU 21 of gateway unit GW will be explained.

First, CPU 21 of gateway unit GW determines whether a roaming flag is contained in the received data signal (Step S11). At this stage, when a roaming flag is not contained (Step S11; No), CPU 21 carries out an ordinary data relaying process such as protocol conversion (Step S12).

On the other hand, when a roaming flag is contained (Step S11; Yes), CPU 21 determines whether the URL denoting the address contained in the data signal is contained in non-accessible URL list 253 (Step S13). When the URL is contained in non-accessible URL list 253 (Step S13; Yes), CPU 21 determines that access is not allowed to obtain the resource denoted by the URL contained in the data signal, and transmits an error notification to notify non-accessibility to mobile unit MS from which the above-mentioned data signal is sent (Step S14).

On the other hand, when the URL in the data signal is not contained in non-accessible URL list 253 (Step S13; No), CPU 21 converts the provider code contained in the data signal into the country code by referring to code conversion table 252 (Step S15). Then, CPU 21 carries out protocol conversion, adds to HTTP header the country code and roaming identification information (Step S16), and transmits an HTTP request for the resource denoted by the URL contained in the data signal (Step S17).

(3) Configuration of Contents Server CP

Next, the configuration of contents servers CP1 to CP4 is explained.

Figure 7:
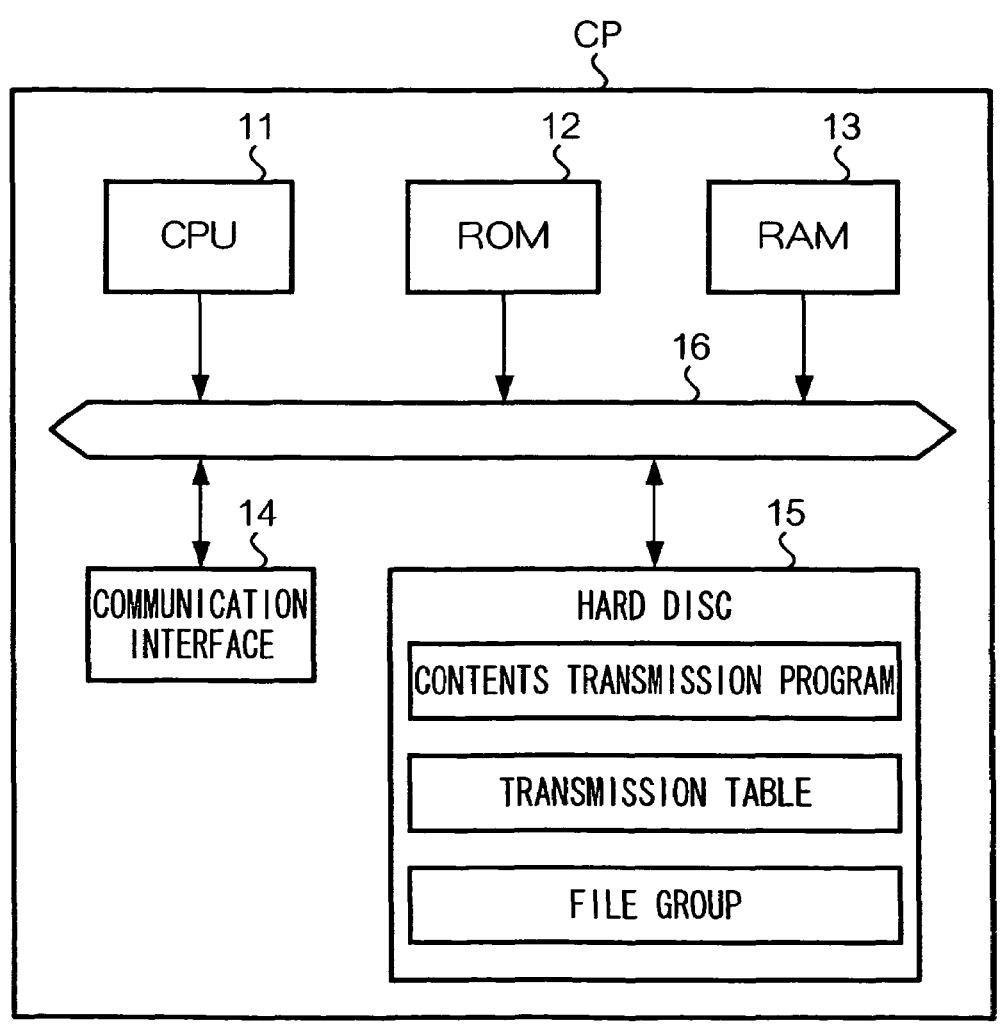
FIG. 7 is a block diagram showing a configuration of a contents server of the system.

FIG. 7 is a block diagram showing configuration common to contents servers CP1 to CP4. As shown in FIG. 7, contents servers CP1 to CP4 comprise CPU 11, ROM 12, RAM 13, communication interface 14, hard disc 15, and bus 16 to connect the above units. In ROM 12, is stored a control program for controlling the basic control such as IPL (Initial Program Loader). CPU 11 achieves several functions (described later) by executing several programs stored in ROM 12 or hard disc 15. RAM 13 is used as a work area of CPU 11 in which, for example, a program is executed by CPU 11, or several kinds of data used for executing the program are temporarily stored. Communication interface 14 carries out packet communication with several communication units via Internet 10.

In hard disc 15, are stored the contents transmission program for transmitting contents, the transmission table for determining whether contents can be transmitted, and a file group such as HTML files denoting several contents files or several homepages.

Contents of the contents transmission program, the transmission table and the file group differ in each of contents servers CP1 to CP4. Hereinafter, the difference is explained.

FIG. 8 is the transmission table stored in contents server CP1. In the transmission table, is stored information denoting whether contents can be transmitted abroad corresponding to file names of each of contents files. CPU 11 of contents server CP1, by executing the transmission program, determines whether contents can be transmitted by referring to contents written in the transmission table. In other words, when CPU 11 determines that contents can be transmitted in response to access from a foreign country, CPU 11 transmits contents to mobile unit MS, but transmits an error notification to mobile unit MS when transmission is not allowed. In this case, contents which are not allowed to be transmitted abroad are protected by copyright, and their use is allowed only in Japan.

FIG. 9 is the transmission table stored in contents server CP2. In the transmission table, are stored, information showing whether contents can be transmitted abroad corresponding to file names of each of contents files, and file names of proxy contents which can be transmitted when contents themselves cannot be transmitted. CPU 11 of contents server SP2, by executing the transmission program, determines whether contents can be transmitted by referring to contents written in the transmission table. In other words, when CPU 11 determines that contents can be transmitted in response to access from a foreign country, CPU 11 transmits to mobile unit MS contents, but transmits to mobile unit MS proxy contents when transmission of contents themselves is not allowed. In this case, contents which are not allowed to be transmitted abroad are protected by the copyright, and their use is allowed only in Japan. On the other hand, proxy contents are contents which are not protected by the copyright, or contents which are protected by the copyright but are also allowed to be used abroad.

Figures 10, 15:
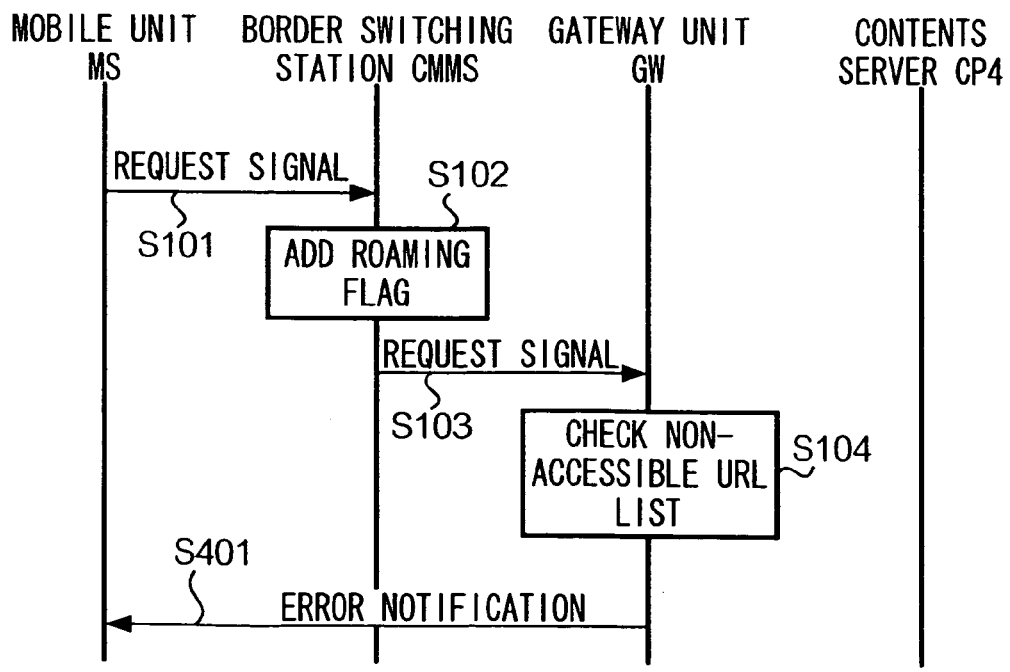
FIG. 10 is a diagram showing one example of a transmission table of the system.
FIG. 15 is a sequence diagram showing an operation example of the system.

FIG. 10 is the transmission table stored in contents server CP3. The transmission table consists of menu table MT in which file names of menu files set forth for each country are written, and country-by-country contents table CT in which country codes of countries to which contents are allowed to be transmitted are written corresponding to a file name of each of the contents files. CPU 11 of contents server CP3, when there is access to a menu file from a foreign country, reads out the menu file corresponding to the country by referring to menu table MT and transmits. In the menu file, are written only menu items of contents which are listed as transmittable in country-by country contents table CT. Then, CPU 11 of contents server SP3, when there is access to obtain contents from a foreign country determines whether contents are allowed to be transmitted by executing the transmission program and referring to country-by-country contents table CT. Then, CPU 11, when transmission of contents is allowed, transmits the contents to mobile unit MS, but transmits an error notification to the above-mentioned mobile unit MS when transmission is not allowed.

The embodiment is configured as thus.

B: Operation

Next, by referring to the sequence shown in FIGS. 11 to 15, an operation example of the communication system of the above-mentioned configuration will be explained.

FIG. 11 is a figure showing the operation required for mobile unit MS in mobile communication network GSM to attempt to obtain contents with the file name "photo.gif" stored in contents server CP 1.

First, mobile unit MS transmits a request signal for requesting contents with the file name "photo.gif" in accordance with the operation carried out by the user. The request signal is received by border switching station CMMS via network connecting network GRX after provider code "100010XX1PL" is added by the provider code notification function of mobile communication network GSM (Step S101). Since the provider code is added to the received request signal, border switching station CMMS adds a roaming flag to the request signal (Step S102), and forwards to gateway unit GW.

Figure 6:
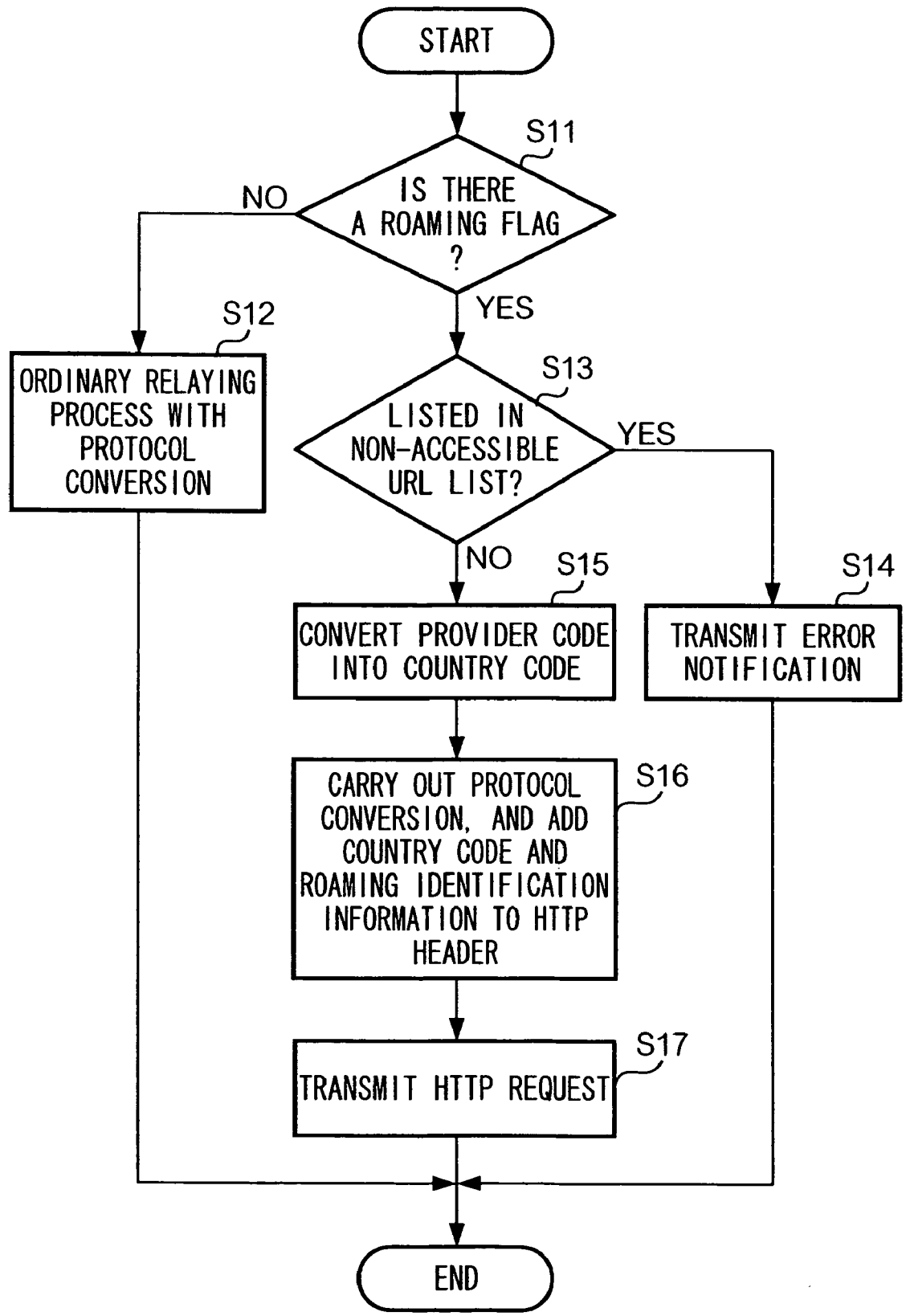
FIG. 6 is a flowchart showing the process carried out by CPU of a gateway server of the system.

When gateway unit GW receives the above-mentioned request signal (Step S103), gateway unit GW first determines whether the URL contained in the request signal is listed in non-accessible URL list 253 in accordance with the process shown in FIG. 6 since a roaming flag is contained in the received data signal (Step S104). In this case, since the file name "photo.gif" is not listed in non-accessible URL list 253 shown in FIG. 5, gateway unit GW refers to code conversion table 252 shown in FIG. 4, and converts the provider code "100010XX1PL" added to the request signal into the country code "C1001" (Step S105). Then, gateway unit GW carries out protocol conversion, adds the country code "C1001" and roaming identification information to HTTP header (Step S106), and transmits an HTTP request to contents server CP1.

When contents server CP1 receives the above-mentioned HTTP request (Step S107), detects roaming identification information by referring to the header of the request (Step S108). Then, contents server CP1 extracts the file name "photo.gif" in the HTTP request, and determines whether the file name "photo.gif" is allowed to be transmitted abroad by referring to the transmission table (Step S109). In this case, as shown in FIG. 8, since contents denoted by the file name "photo.gif" are not allowed to be transmitted abroad, contents server CP 1 transmits an error message denoting that transmission is not allowed to mobile unit MS. When mobile unit MS receives the error notification (Step S110), mobile unit MS displays on the displaying unit a message on the basis of the error notification such as "These contents are not allowed to be transmitted abroad."

Figure 12:
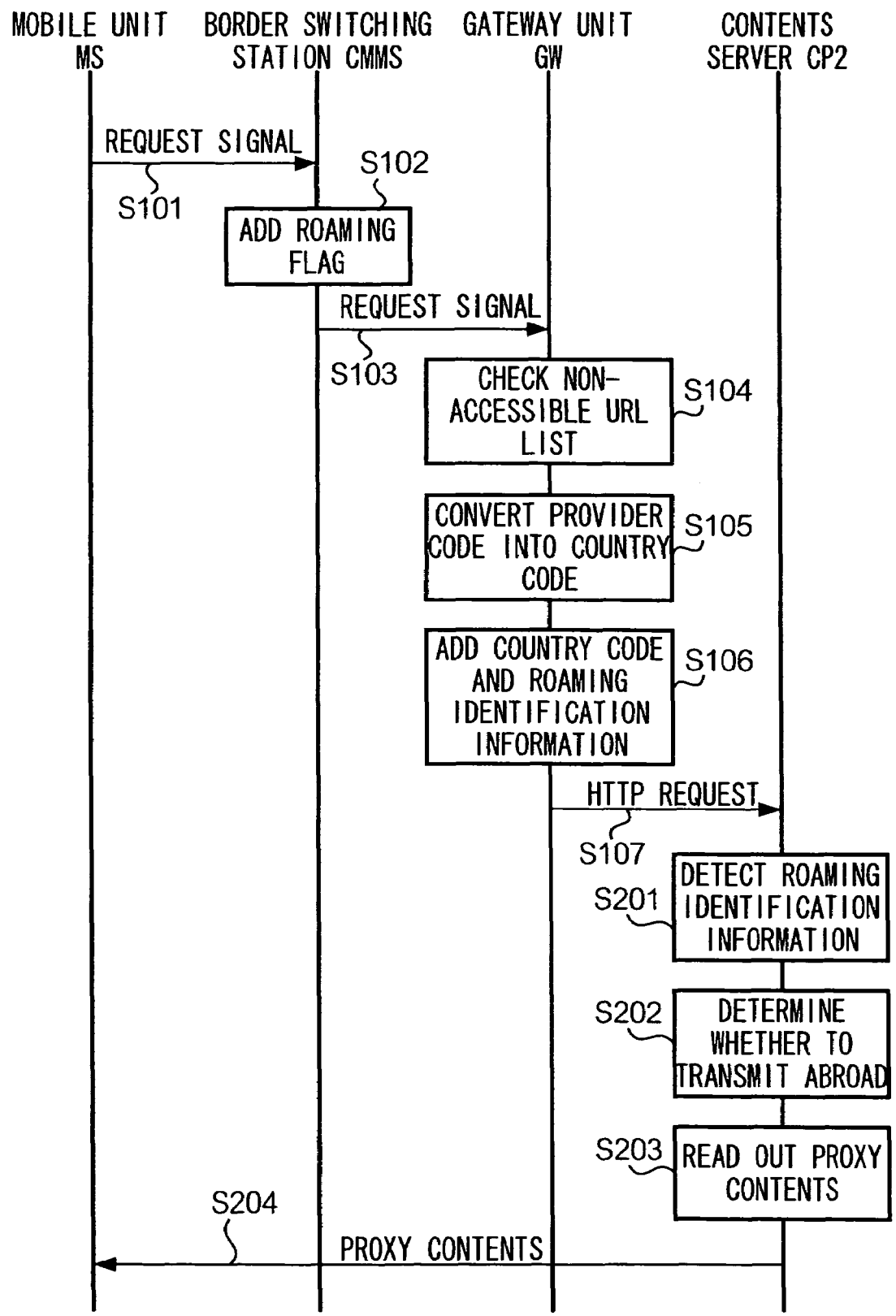
FIG. 12 is a sequence diagram showing an operation example of the system.

Next, FIG. 12 is a figure showing the operation required for mobile unit MS in mobile communication network GSM to attempt to obtain contents of the file name "movie.gif" stored in contents server CP 2.

First, mobile unit MS transmits a request signal for requesting contents with the file name "movie.gif" in accordance with the operation carried out by the user. The request signal reaches contents server CP2 in the same process as that of the above-mentioned steps S101 to S107.

When contents server CP2 receives the above-mentioned HTTP request, contents server CP2 refers to the header of the request and detects roaming identification information (Step S201). Then, contents server CP2 extracts the file name "movie.gif" in the HTTP request, and determines whether the file name "movie.gif" is allowed to be transmitted abroad by referring to the transmission table (Step S202). In this case, as shown in FIG. 9, since the contents denoted by the file name "movie.gif" are not allowed to be transmitted abroad, contents server CP2 reads out the contents denoted by the file name "aaa.gif" which is designated as proxy contents from hard disc 15 (Step S203), and transmits to mobile unit MS the proxy contents along with information showing that the contents transmitted are the proxy contents. When mobile unit MS receives the proxy contents (Step S204), mobile unit MS displays on the displaying unit the GIF image of the proxy contents along with the message denoting that the contents are proxy contents.

Figure 13:
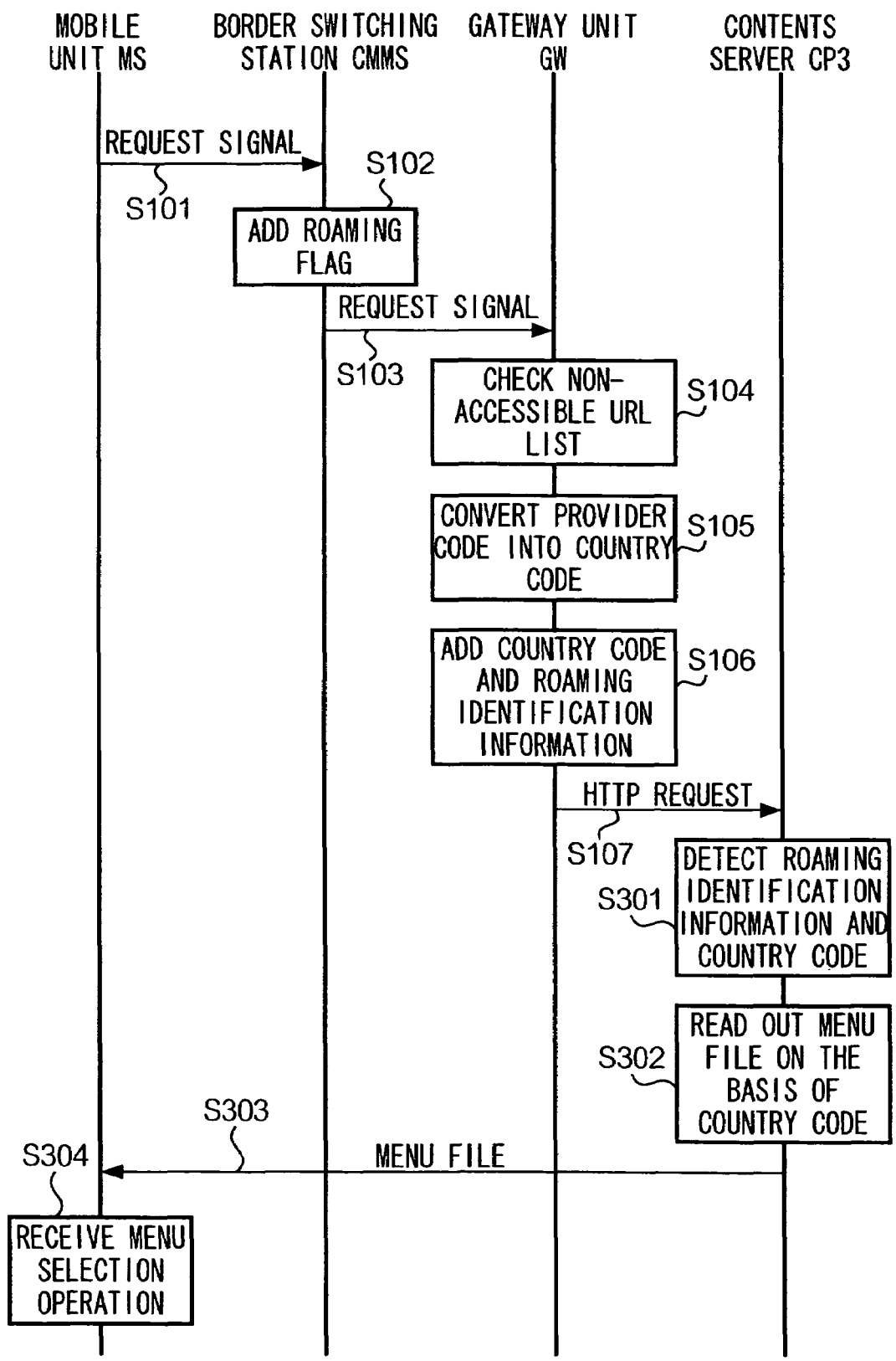
FIG. 13 is a sequence diagram showing an operation example of the system.
Figure 14:
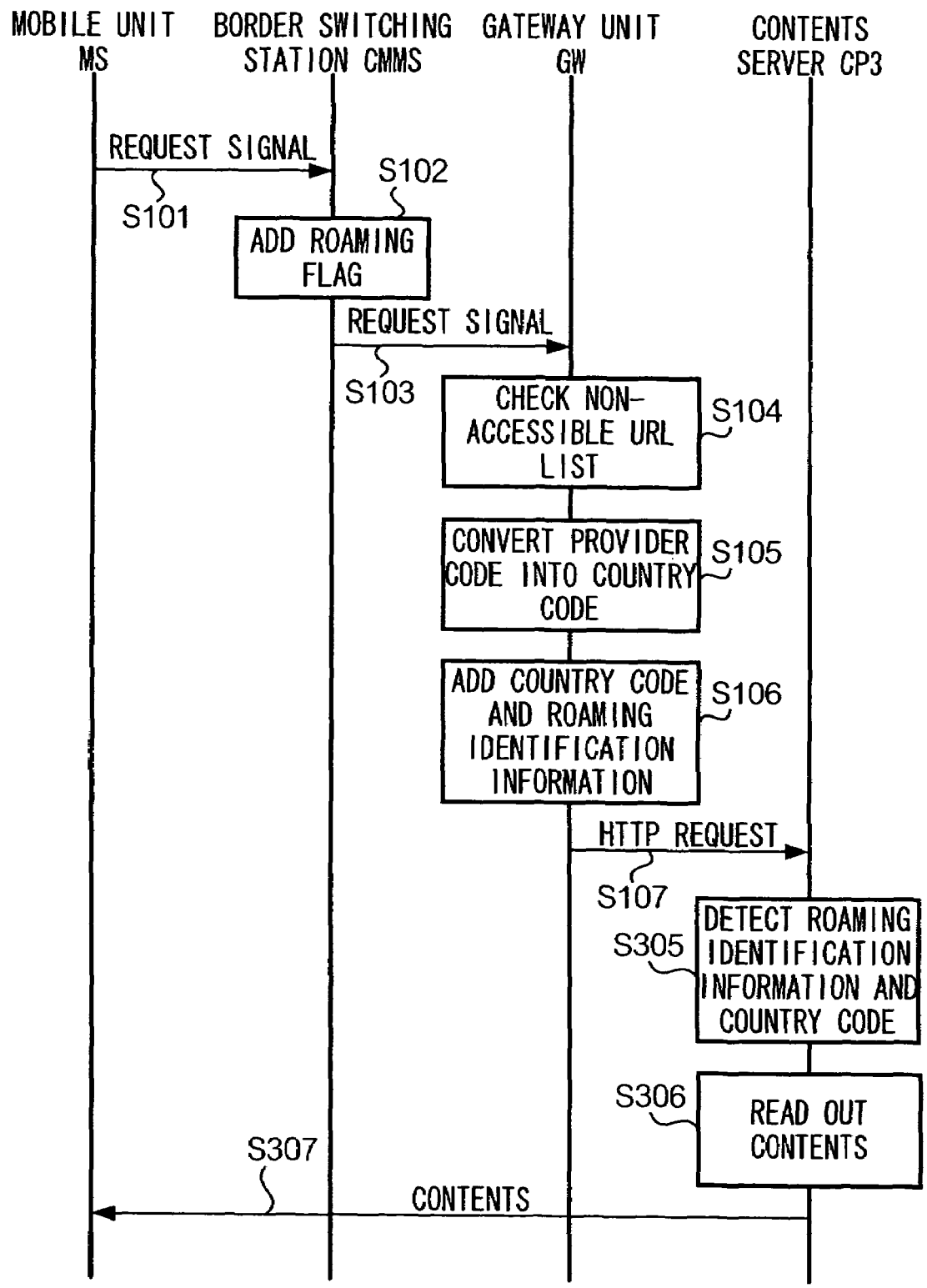
FIG. 14 is a sequence diagram showing an operation example of the system.

Next, FIGS. 13 and 14 are figures showing the operation required for mobile unit MS in mobile communication network GSM to access contents server SP3.

First, mobile unit MS transmits a request signal for requesting a menu file in accordance with the operation of the user. The request signal reaches contents server CP3 in the same process as that of the above-mentioned Steps S101 to S107.

When contents server CP3 receives the above-mentioned HTTP request, contents server CP3 refers to the header of the request and detects roaming identification information and the country code (Step S301). Then, contents server CP3 refers to menu table MT shown in FIG. 10, reads out from hard disc 15 the menu file denoted by the file name "C1001menu.html" corresponding to the extracted country code "C1001" (Step S302), and transmits the menu file to mobile unit MS. When mobile unit MS receives the menu file (Step S303), mobile unit MS displays the menu.

Then, when the user carries out an operation to choose contents he/she desires, mobile unit MS receives the operation (Step S304), transmits the request signal for requesting the chosen contents (in this case, contents denoted by the file name "best.gif"). The request signal reaches contents server CP3 in the same process as that of the above-mentioned Steps S101 to S107.

When contents server CP3 receives the above-mentioned HTTP request, contents server CP3 refers to the header of the request, and detects roaming identification information and the country code "C1001" (Step S305). Then, contents server CP3 refers to country-by-country contents table CT shown in FIG. 10, confirms that the requested contents are allowed to be transmitted to the country denoted by the country code "C1001", reads out the contents from hard disc 15 (Step S306), and transmits the contents to mobile unit MS. Mobile unit MS receives the contents (Step S307), and displays the contents on the displaying unit.

Next, FIG. 15 is the operation required for mobile unit MS in mobile communication network GSM to access contents server CP4.

First, mobile unit MS transmits a request signal for requesting contents stored in contents server CP4 in accordance with the operation of the user. The request signal reaches gateway unit GW in the same process as that of the above-mentioned Steps S101 to 103.

When gateway unit GW receives the above-mentioned request signal, gateway unit GW first determines whether the URL contained in the request signal (for example, "abc.cojp/html") is listed in non-accessible URL list 253 in accordance with the process shown in FIG. 6 since a roaming flag is contained in the received data signal (Step S104). In this case, since the domain name "abc.cojp" is listed in the non-accessible URL list shown in FIG. 5, gateway unit GW transmits an error notification to notify that access is not permitted to mobile unit MS from which the above-mentioned data signal is transmitted. When mobile unit MS receives the error notification (Step S401), mobile unit MS displays a message such as "The requested contents are not allowed to be transmitted abroad" on the displaying unit on the basis of the error notification.

According to the embodiment explained above, transmission of inappropriate contents can be prevented. In this case, inappropriate contents are contents which are protected by the copyright and are allowed to be used only in Japan, or contents determined not transmittable taking into account cultural restrictions.

As already explained, the present invention is not restricted to the above-mentioned embodiment, but various changes are possible as follows.

For example, in the embodiment, roaming ends are divided for each country, but roaming ends can be divided in different manners. For example, a region consisting of a plurality of countries (such as, European Union (EU)) can be regarded as one group. Or, one country can be divided into a plurality of regions taking into account circumstances such as religion or politics. Also, even if a region is not internationally recognized as a "country", that region can be regarded as one country in the present invention. In other words, in the present invention, as long as the domain (area) is divided taking into account what sort of contents should be transmitted, each domain (area) can be regarded as independent in spite of names such as "a country", "a state", "a county", "a region" or "a district." The word "area" in Claims is used in the same meaning as in the above description.

Also, in the embodiment, gateway unit GW converts the provider code and the roaming flag into the country code which can be interpreted by contents server CP, and roaming identification information which can be interpreted by contents server CP respectively. However, when contents server wishes to divide roaming ends by communication providers as opposed to country codes, gateway unit GW can convert the provider code into provider identification information which can be interpreted by contents server CP.

When contents server CP itself can interpret a provider code or a roaming flag, gateway unit GW does not need to carry out the conversion process explained above.

Also, in the embodiment, whether the access is from a roaming end is detected on the basis of the provider code notified by the provider code notification function the communication network of the roaming end comprises, but a different measure can be taken. For example, when mobile unit MS comprises a location measurement function by using GPS (Global Positioning System), whether access is from a roaming origin or a roaming end can be determined on the basis of location information by adding location information measured by the GPS function to the request signal.

Also, in the embodiment, each time a request signal is transmitted from mobile unit MS, whether access is from a roaming end or a roaming origin is determined on the basis of information added to the request signal, but a different measure can be taken.

For example, in the home location register which a mobile communication network usually comprises, is stored location registration information on mobile unit MS, in other words, the area ID of the location registration area where mobile unit MS is present and the telephone number of mobile unit MS in a corresponding manner. When information showing that mobile unit MS is in a foreign country is registered with the home location register, whether access is from a roaming end or a roaming origin can be determined only by referring to registration contents of the home location register. Registering with the home location register can be carried out by a user operating mobile unit MS.

Also, in the embodiment, no contents are transmitted when there is access from a foreign country, but a different measure can be taken.

For example, contents can be transmitted on the basis of agreement for paying a separate fee in addition to the fee the user pays for the contents transmission service. In this case, when contents server CP determines that mobile unit MS accesses from a roaming end, contents server CP first transmits to mobile unit MS a message inquiring the user whether he/she will pay a separate fee. Then, contents can be transmitted when the user carries out the operation to express his/her willingness to pay the separate fee. In the separate fee, is contained the copyright fee for using contents in an area of a roaming end. With regard to the separate fee, a different amount can be charged according to an area of a roaming end.

Further, when contents are transmitted to a roaming end, the contents transmission service can be provided free of charge. For example, a contents provider who wishes to transmit advertisement contents to users in the area of the roaming end might agree to pay for the cost required for transmitting the contents. In this case, the contents provider can transmit advertisement contents free of charge. Contents such as information on danger in an area of a roaming end (such as information on security or terrorism) can also be transmitted free of charge in addition to an advertisement.

Also, with regard to mobile unit MS, a cellular telephone of IMT-2000 style is exemplified, but different styles can be also used. For example, a cellular telephone of PDC (Personal Digital Cellular) style, or a simple cellular telephone of PHS (Personal Handyphone System) can be also used.

The program which the above-mentioned gateway unit GW or contents servers CP1 to CP4 execute can be provided by storing in a recording medium such as a magnetic recording medium, an optical recording medium or ROM which can be read by gateway unit GW or contents servers CP1 to CP4. Also, the above programs can be downloaded by gateway unit GW or contents servers CP1 to CP4 via a network such as the Internet.

Also, although IMT and GSM are exemplified as a roaming origin and a roaming end respectively, the following combinations of a roaming origin and a roaming end are also possible.

| Roaming Origin | Roaming End |
|---|---|
| IMT | IMT |
| IMT | GSM |
| GSM | GSM |
| GSM | IMT |

Also, although an example of connecting gateway unit GW and contents server CP via Internet INET is explained, gateway unit GW and contents server CP can be directly connected without Internet INET.

The invention claimed is:

1. A communication system comprising:
   a home mobile communication network for providing to a mobile unit of a user under a contractual agreement with said home mobile communication network a roaming service via a foreign mobile communication network; and
   a contents server for transmitting to said mobile unit contents via said home mobile communication network, or via said mobile communication network and said foreign mobile communication network, wherein said contents include transmittable contents that are accessible via the home mobile communication network and the foreign mobile communication network, and non-transmittable contents accessible via the home mobile communication network,
   wherein said home mobile communication network comprises:
      data relaying means for receiving a data signal addressed to said contents server and transmitted from said mobile unit, and transmitting to said contents server the received data signal;
      storage means for storing contents identification information identifying said non-transmittable contents which are designated not to be transmitted to said mobile unit in said foreign mobile communication network among said transmittable contents that can be transmitted from said contents server; and
      rejection means for determining presence of roaming identification information added to said data signal received from said home mobile unit in said foreign mobile communication network and transmitted to said contents server, and for rejecting a request for any one of said non-transmittable contents denoted by said contents identification information stored in said storage means, contained in said data signal which is received by said data relaying means, addresses to said contents server and transmitted from said mobile unit in said foreign mobile communication network, if the roaming identification information is determined to be present.

2. A relaying unit which is provided in a home mobile communication network for providing to a mobile unit of a user under a contractual agreement with said network in which said relaying unit is provided, a roaming service via a foreign mobile communication network, said relaying unit comprising:
   data relaying means for receiving a data signal transmitted from said mobile unit and addressed to a contents server which provides a contents transmission service, and transmitting to said contents server the received data signal;
   storage means for storing contents identification information configured to identify non-accessible contents which are designated not to be transmitted to said mobile unit in said foreign mobile communication network and accessible contents which can be transmitted from said contents server to said mobile unit in said home mobile communication network and said foreign mobile communication network; and
   rejection means for determining presence of roaming identification information added to said data signal received from said mobile unit in said foreign mobile communication network and transmitted to said contents server, and for rejecting a request for any non-accessible contents denoted by said contents identification information stored in said storage means, contained in said data signal which is received by said data relaying means, addressed to said contents server and transmitted from said mobile unit in said foreign mobile communication network, if the roaming identification is determined to be present.

3. A contents server configured to be connected to a home mobile communication network for providing to a mobile unit of a user under a contractual agreement with said home mobile communication network a roaming service via a foreign mobile communication network, said contents server comprising:

contents transmission means for receiving a data signal transmitted from a mobile unit via said home mobile communication network, and transmitting contents to said mobile unit in response to a request contained in said data signal, wherein said contents include accessible contents that are transmittable via the home mobile communication network and the foreign mobile communication network, and non-accessible contents transmittable via the home mobile communication network; and detection means for detecting whether a data signal received by said contents transmission means is attached with roaming identification information added to said data signal, said roaming identification information showing that said data signal is transmitted from said mobile unit in said foreign mobile communication network to which said server is not connected and to which said mobile unit does not belong, wherein said contents transmission means, when said detection means detects that said data signal is attached with said roaming identification information, is configured to transmit to said mobile unit which transmits said data signal a notification that requested non-accessible contents cannot be transmitted.

4. A contents server configured for connection to a home mobile communication network for providing to a mobile unit of a user under contractual agreement with said home mobile communication network a roaming service via a foreign mobile communication network, said contents server comprising:

contents transmission means for receiving a data signal transmitted from said mobile unit via said home mobile communication network, and transmitting contents to said mobile unit in response to a request contained in said data signal, wherein said contents include accessible contents that are transmittable via the home mobile communication network and the foreign mobile communication network, and non-accessible contents transmittable via the home mobile communication network; and detection means for detecting whether said data signal received by said contents transmission means is attached with a roaming identification information added to said data signal, said roaming identification information showing that said data signal is transmitted from said mobile unit in said foreign mobile communication network to which said server is not connected and to which said mobile unit does not belong, wherein said contents transmission means, when said detection means detects that said data signal is attached with said identification information, is configured to transmit to said mobile unit which transmits said data signal proxy contents that substitute for said non-accessible contents.

5. A contents server according to claim 3 or claim 4 wherein:

said detection means configured to detect whether said data signal received by said contents transmission means is attached with an area identification information for identifying an area served by said home mobile communication network to which said mobile unit belongs, or with a provider identification information for identifying said home mobile communication network itself to which said mobile unit belongs, wherein said contents transmission means, only when said detection means detects that said data signal is attached with said area or provider identification information, configured to transmit contents in accordance with said area or provider identification information to said mobile unit.

6. A communication system comprising:

a home mobile communication network contractually configured to provide a roaming service to a mobile unit via a foreign mobile communication network;

a contents server configured to transmit content to said mobile unit via said home mobile communication network and said foreign mobile communication network, wherein said content includes transmittable content that are accessible via the home mobile communication network and the foreign mobile communication network, and non-transmittable content via accessible the home mobile communication network, wherein said home mobile communication network comprises:

a data relay configured to receive a data signal transmitted from said mobile unit and addressed to said contents server, and configured to transmit said data signal to said contents server;

a memory configured to store identification information, wherein the identification information designates transmittable content accessible from the content server, and non-transmittable content not accessible to said mobile unit in said foreign mobile communication network; and an access rejection function configured to:

determine the presence of roaming identification information within said data signal transmitted to said contents server from said mobile unit in said foreign mobile communication network, and reject a request directed to non-transmittable content not accessible as designated by identification information stored in said memory, wherein said request is addressed to said contents server and transmitted from said mobile unit in said foreign mobile communication network as indicated by said roaming identification information within said data signal.

* * * * *

UNITED STATES PATENT AND TRADEMARK OFFICE
CERTIFICATE OF CORRECTION

PATENT NO. : 7,386,311 B2 Page 1 of 1
APPLICATION NO. : 10/761663
DATED : June 10, 2008
INVENTOR(S) : Soga et al.

It is certified that error appears in the above-identified patent and that said Letters Patent is hereby corrected as shown below:

On the cover page,

Item [*] Notice: Delete the phrase "by 594 days" and insert -- by 549 days --

Signed and Sealed this

Ninth Day of December, 2008

JON W. DUDAS
*Director of the United States Patent and Trademark Office*